(12) United States Patent
Mukasa

(10) Patent No.: US 7,085,462 B2
(45) Date of Patent: Aug. 1, 2006

(54) OPTICAL FIBER, OPTICAL FIBER MODULE AND OPTICAL AMPLIFIER

(75) Inventor: Kazunori Mukasa, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 482 days.

(21) Appl. No.: 10/309,249

(22) Filed: Dec. 4, 2002

(65) Prior Publication Data
US 2003/0133678 A1    Jul. 17, 2003

(30) Foreign Application Priority Data

| Dec. 5, 2001 | (JP) | ............................. 2001-371606 |
| Dec. 14, 2001 | (JP) | ............................. 2001-381739 |
| Aug. 21, 2002 | (JP) | ............................. 2002-240646 |

(51) Int. Cl.
*G02B 6/02* (2006.01)
(52) U.S. Cl. ........................... 385/123; 385/126
(58) Field of Classification Search ........ 385/123–128, 385/141–145
See application file for complete search history.

(56) References Cited

U.S. PATENT DOCUMENTS

| 6,009,221 | A | 12/1999 | Tsuda |
| 6,445,864 | B1 * | 9/2002 | Jiang et al. .................. 385/127 |
| 6,477,306 | B1 * | 11/2002 | Kato et al. .................. 385/123 |
| 6,574,407 | B1 * | 6/2003 | Sillard et al. ................ 385/123 |

* cited by examiner

*Primary Examiner*—Thien M. Le
*Assistant Examiner*—Jamara A. Franklin
(74) *Attorney, Agent, or Firm*—Oblon, Spivak, McClelland, Maier & Neustadt, P.C.

(57) ABSTRACT

An optical fiber whose value of a ratio of a dispersion to the dispersion slope ranges between 50 nm and 150 nm at the wavelength of 1590 nm. Also, a dispersion compensated optical fiber includes a depressed layer formed of at least one of a plurality of core layers covering the outer circumference of the center core. The depressed layer has −0.7% or less of a relative refractive index difference with the clad. The dispersion compensated optical fiber has the ratio of the dispersion to the dispersion slope falling within a range of between 30 nm and 80 nm at the wavelength of 1550 nm, or a dispersion value not larger than −20 ps/nm/km, a dispersion slope not larger than −0.05 ps/nm$^2$/km, and an effective core cross sectional area A$_{eff}$ falling within a range of between 8 and 13 μm$^2$.

34 Claims, 3 Drawing Sheets

OPTICAL FIBER, OPTICAL FIBER MODULE AND OPTICAL AMPLIFIER

CROSS-REFERENCE TO RELATED APPLICATIONS

This application is based upon and claims the benefit of priority from the prior Japanese Patent Applications No. 2001-371606, filed Dec. 5, 2001; No. 2001-381739, filed Dec. 14, 2001; and No. 2002-240646, filed Aug. 21, 2002, the entire contents of all of which are incorporated herein by reference.

BACKGROUND OF THE INVENTION

1. Field of the Invention

The present invention relates to an optical fiber suitable for a wavelength divided multiplex transmission, an optical fiber module using the particular optical fiber, and an optical amplifier.

2. Description of the Related Art

Wavelength division multiplexing transmission system has been studied in 1.55 µm wavelength band, which is a gain band of an erbium-added optical fiber, and the non-zero dispersion shifted optical fiber (NZ-SF) having about 4 to 8 ps/nm/km of dispersion in the 1.55 µm waveband is commercialized for an optical transmission line. Incidentally, the 1.55 µm wavelength band is generally called C-band and approximately ranges between 1530 nm and 1570 nm.

In order to realize a high quality wavelength division multiplexing transmission, it is important to suppress the self phase modulation (SPM) and the cross phase modulation (XPM), and necessary to expand the effective area of the optical fiber for the suppression. Therefore, the NZ-DSF having large effective area has been studied, for example, OFC'96 WK15 and OFC'97 TuN2.

However, larger effective cross sectional area of the NZ-DSF may result in increasing the bend loss and the dispersion slope.

Under the circumstances, extensive research has been conducted in an attempt to overcome the problem noted above by optimizing the refractive index profile and manufacturing conditions for a cable. However, it is still a difficult problem to reduce the dispersion slope. Particularly, in the high speed transmission not lower than 40 Gb/s, recently vigorously studied, the increase in the dispersion slope has become a serious problem to be solved.

Also, the wavelength division multiplexing transmission region is studied to be expanded into L-band (the wavelength range of between 1570 nm and 1610 nm).

Incidentally, the NZ-DSF has a dispersion of approximately 4 to 8 ps/nm/km at the wavelength of 1.55 µm, and a positive dispersion slope. When the absolute value of the dispersion is excessively small, the transmission characteristics caused by the four wave mixing (FWM) deteriorates. In order to suppress such deterioration, the dispersion of the NZ-DSF in the 1.55 µm wavelength band is not set at a very small value.

Under the circumstances, it is proposed to compensate the dispersion and the dispersion slope of the NZ-DSF in the 1.55 µm band by using a dispersion slope compensating fiber (DSCF). Various proposals have been made since the particular technology was reported in ECOC '96TuP. 1.

However, the above DSCF was proposed to compensate the dispersion slope of the NZ-DSFs having the dispersion characteristics as shown "b" and "c" in FIG. 1.

However, the compensation of the dispersion slope has not been proposed in the past for NZ-DSF having a large dispersion slope as denoted by "a" shown in FIG. 1. Particularly, the study was scarcely made on the optimization of the compensation of the dispersion slope in the L-band of the NZ-DSF having a large absolute value of the dispersion slope.

Incidentally, the straight lines "a", "b", "c" shown in FIG. 1 denote the dispersion characteristics, where the dispersion at the wavelength of 1550 nm is set at 5 ps/nm/km. The NZ-DSF denoted by "a" has a dispersion of about 10 ps/nm/km in the L-band. It was difficult to compensate for the dispersion by the DSCF proposed above.

It should also be noted that the DCF has a high non-linearity and is expected for a Raman amplifying medium. However, sufficient study has not yet been made concerning the optimization thereof.

BRIEF SUMMARY OF THE INVENTION

An objective of the present invention is to provide an optical fiber for compensating the dispersion of a non-zero dispersion shifted fiber, which is adapted for the Raman amplification to cope with high speed transmission.

Another objective of the present invention is to provide an optical fiber module for compensating the dispersion of a non-zero dispersion shifted fiber, which is adapted for the Raman amplification to cope with high speed transmission.

Further, yet another objective of the present invention is to provide an optical amplifier attached with an optical fiber for compensating the dispersion of a non-zero dispersion shifted fiber, which is adapted for the Raman amplification to cope with high speed transmission.

A first aspect of the present invention provides an optical fiber whose value of the ratio of the dispersion to the dispersion slope ranges between 50 nm and 150 nm at a wavelength of 1590 nm.

A second aspect of the present invention provides a dispersion compensating optical fiber whose value of a ratio of a dispersion to a dispersion slope ranges between 30 nm and 80 nm at a wavelength of 1550 nm, comprising of a core and a clad covering the outer circumference of the core, wherein the core includes a first core layer formed in the central portion of the optical fiber and one or more core layers covering the outer circumference of the first core layer, wherein at least one of such core layers covering the outer circumference of the first core layer forms a depressed layer having a relative refractive index difference not larger than −0.7% with the clad.

A third aspect of the present invention provides a dispersion compensating optical fiber which has a dispersion value not larger than −20 ps/nm/km, a dispersion slope not larger than −0.05 ps/nm$^2$/km, and an effective core cross sectional area $A_{eff}$ in between 8 and 18 µm$^2$.

Additional objectives and advantages of the present invention will be set forth in the description which follows, and in part will be obvious from the description, or may be learned by practice of the present invention. The objectives and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE INVENTION

Figure 1:
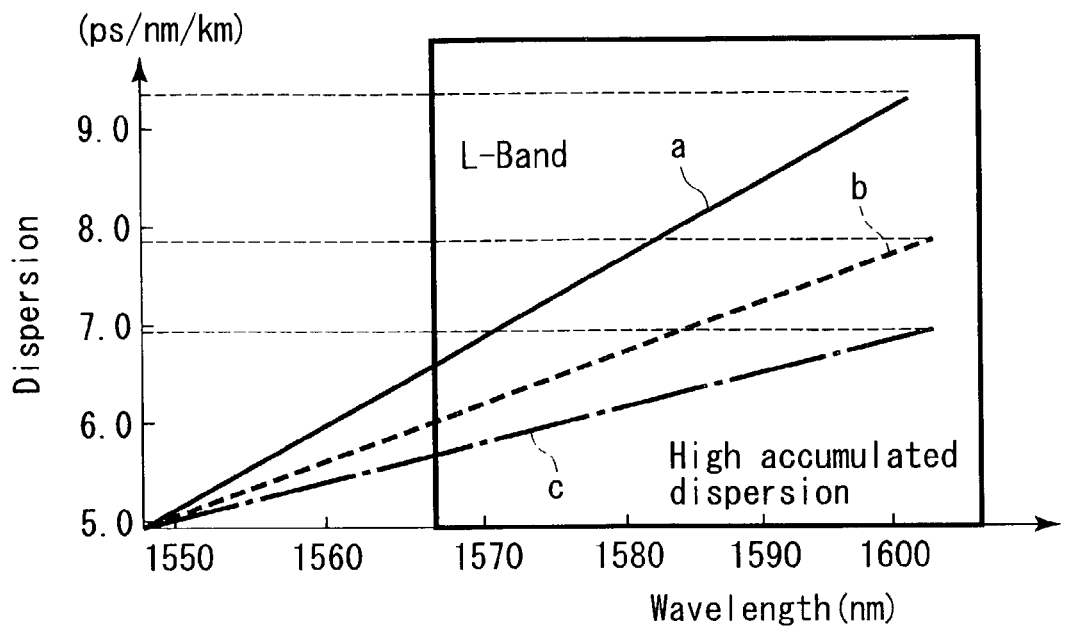
FIG. 1 is a graph showing the relationship between the wavelength and the dispersion.

The optical fiber according to the first aspect of the present invention has the value of the ratio of the dispersion to the dispersion slope in between 50 nm and 150 nm at a wavelength of 1590 nm.

There are various embodiments in the optical fiber according to the first aspect of the present invention, which is constructed as described above:

(1) An optical fiber having a cutoff wavelength not longer than 1565 nm in the fiber length of 2 m.

(2) An optical fiber having a bend loss in a diameter of 20 mm, which is not larger than 10 dB/m at a wavelength of 1590 nm.

(3) An optical fiber having a dispersion value not larger than −30 ps/nm/km at a wavelength of 1590 nm.

(4) An optical fiber, comprising a core and a clad covering the outer circumference of the core, wherein said core includes a first core layer formed in the central portion of the optical fiber and one or more core layers covering the outer circumference of said first core layer, and at least one of said core layers covering the outer circumference of said first core layer forming a depressed layer having a relative refractive index difference not larger than −0.6% based on the glad.

(5) An optical fiber, comprising a core and a clad covering the outer circumference of said core, wherein the said core includes a first core layer formed in the central portion of the optical fiber and one or more core layers covering the outer circumference of said first core layer, and at least one of such core layers covering the outer circumference of said first core layer forming a depressed layer having a relative refractive index difference not larger than −0.7% with the clad.

(6) An optical fiber having a relative refractive index difference of at least 1.8% between said first core layer and said clad.

(7) An optical fiber in which a second core layer contiguous to said first core layer and covering the outer circumference of said first core layer forms the depressed layer.

(8) An optical fiber comprising a third core layer covering the outer circumference of said second core layer and having a refractive index larger than that of said clad and smaller than that of said first core layer.

(9) An optical fiber in which the relative refractive index difference between said third core and said clad is in between 0.1% and 0.6%.

(10) An optical fiber in which the outer diameter of said first core layer is 0.15 to 0.45 times the outer diameter of said second core layer, and the outer diameter of said third core layer is 1.2 to 1.8 times the outer diameter of said second core layer.

(11) An optical fiber in which the transmission loss at the wavelength of 1590 nm is not larger than 1.0 dB/km.

The optical fiber according to the second aspect of the present invention has the value of the ratio of the dispersion to the dispersion slope in between 30 nm and 80 nm at the wavelength of 1550 nm and comprises a core and a clad covering the outer circumference of the core, wherein the core includes a first core layer formed in the central portion of the optical fiber and one or more core layers covering the outer circumference of said first core layer, and at least one of such core layers covering the outer circumference of said first core layer forming a depressed layer having a relative refractive index difference not larger than −0.7% relative the clad.

In the dispersion compensating optical fiber according to the second aspect of the present invention, which is constructed as described above, the DPS at a wavelength in the range of 1.55 μm band (C band) is made close to the DPS of a high dispersion slope type NZ-DSF by optimizing the refractive index profile. As a result, it is possible to compensate efficiently for both the dispersion and the dispersion slope of a high dispersion type NZ-DSF.

Also, in the optical fiber according to the second aspect of the present invention, the said optical fiber is allowed to perform a single mode operation without fail at a wavelength in the 1.55 μm band by setting the cutoff wavelength at 1500 nm or less at the fiber length of 2 m.

Also, in the optical fiber according to the second aspect of the present invention, the bend loss can be suppressed by setting the bend loss at 10 dB/m or less at a diameter of 20 mm at a wavelength of 1550 nm. As a result, it is possible to suppress, for example, the deterioration of the characteristics when the optical fiber is wound in the form of a coil so as to prepare an optical fiber module.

Also, in the optical fiber according to the second aspect of the present invention, by setting the dispersion at a wavelength of 1550 nm at −40 ps/nm/km or less, it is possible to compensate efficiently for the dispersion of the NZ-DSF at a wavelength in the 1.55 μm band, with a short length at the wavelength.

Further, in the optical fiber according to the second aspect of the present invention, it is possible to suppress the transmission loss in the 1.55 μm wavelength band by setting the transmission loss μm at the wavelength of 1550 nm to 1.0 dB/km or less. As a result, it is possible to suppress the increase in the loss of the optical transmission system formed by connecting the optical fiber of the present invention to the NZ-DSF.

The dispersion compensating optical fiber according to the third aspect of the present invention is featured in that the optical fiber has a dispersion value not larger than −20 ps/nm/km, a dispersion slope not higher than −0.05 ps/nm$^2$/km, and an effective core cross sectional area $A_{eff}$ in between 8 and 13 μm$^2$.

In order to compensate for the dispersion of the NZ-DSF in the optical fiber according to the third aspect of the present invention, it is necessary for the dispersion to be not larger than −20 ps/nm/km, since dispersion higher than this increase the module size.

Also, in order to compensate for the dispersion of the NZ-DSF, it is necessary for the dispersion slope to be not higher than −0.05 ps/nm²/km. If the dispersion slope exceeds −0.05 ps/nm²/km, it is impossible to obtain a required compensation rate.

Incidentally, the compensation rate is determined by the formula given below:

$$R=(B/C)/(D/E)$$

where R represents the compensation rate (%), B represents the dispersion slope of DCF, c represents the dispersion slope of NZ-DSF, D represents the dispersion of DCF, and E represents the dispersion of NZ-DSF.

Further, in order to compensate for the dispersion of the NZ-DSF in view of the Raman amplification for the high speed transmission, it is necessary for the effective core cross sectional area $A_{eff}$ to be in between 8 and 13 µm². If $A_{eff}$ exceeds 13 µm², it is impossible to obtain the required Raman amplification effect. On the other hand, $A_{eff}$ smaller than 8 µm² is undesirable because the nonlinear phenomenon within the optical fiber is rendered prominent.

The dispersion compensating optical fiber of the present invention, which is constructed as described above, makes it possible to compensate effectively the dispersion of the NZ-DSF and is adapted for the Raman amplification for high speed transmission.

In order to compensate for the dispersion of the NZ-DSF having a high dispersion slope, in the dispersion compensating optical fiber according to the third aspect of the present invention, it is desirable for the value of the ratio of the dispersion to the dispersion slope to be in between 30 nm and 150 nm, more desirably in between 30 nm and 80 nm, at a wavelength of 1550 nm.

Also, for the optimization in the module preparation, it is desirable for the bend loss in a diameter of 20 mm to be not larger than 20 dB/m at a wavelength of 1550 nm. Further, for compensating the SM operation at a wavelength of 1550 nm, it is desirable for the cutoff wavelength to be not longer than 1550 nm.

It is possible for the optical fiber according to the second and third aspects of the present invention to comprise a center core, a side core and a clad arranged in the order mentioned as viewed from the inner side and exhibit a W-type refractive index profile, wherein, Δ1, the relative refractive index difference of said center core with said clad is not smaller than 1.8%, preferably in between 1.8% and 2.8%, α is in between 1.5 and 15, Δ2, the relative refractive index difference of said side core with said clad is not larger than −0.4, and the ratio Ra1 of the core diameter of said center core to that of said side core is in between 0.20 and 0.50. In this case, it is more desirable for Δ2 to be not larger than −0.7%.

Also, it is possible for the optical fiber according to the second and third aspects of the present invention to comprise a center core, a side core, a segment core and a clad arranged in the order mentioned as viewed from the inner side and exhibit a W+segment type refractive index profile. In this case, it is desirable for the relative refractive index difference Δ3 of said segment core with said clad to be in between 0.2% and 0.6% and for the ratio Ra2 of the core diameter of said segment core to that of said side core to be in between 1.3 and 1.8.

A fourth aspect of the present invention provides an optical fiber module comprising the optical fiber defined as above. The use of such a dispersion compensating optical fiber producing the prominent effects described above makes it possible to obtain a low loss optical fiber module capable of efficiently compensating for the dispersion and the dispersion slope of the NZ-DSF at a wavelength, for example, in the 1.55 µm band.

A fifth aspect of the present invention provides an optical amplifier using the above defined optical fiber as a Raman amplifying medium. Since the optical fiber defined in the present invention produces excellent Raman amplifying characteristics, it is possible to realize an optical amplifier of high performance.

Various embodiments of the present invention will now be described with reference to the accompanying drawings.

Figure 2:
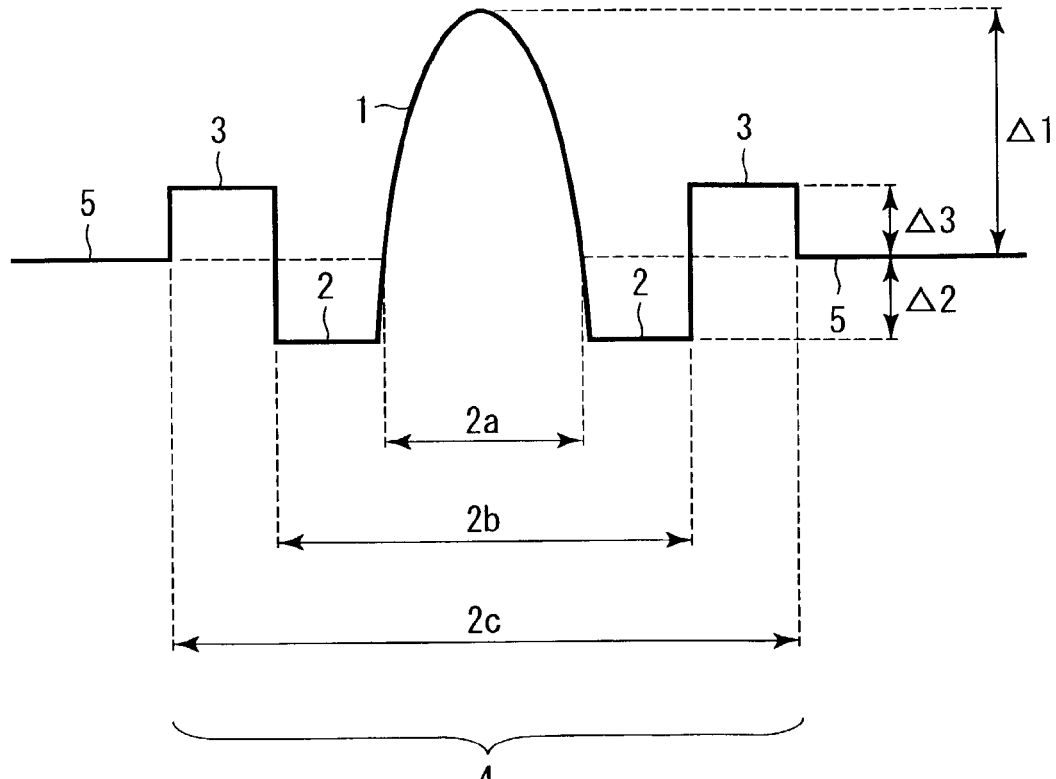
FIG. 2 shows a W+segment type refractive index profile according to one embodiment of the present invention.

FIG. 2 shows the refractive index profile of the optical fiber according to a first embodiment of the present invention.

Various types of refractive index profiles can be used as the profile of the refractive index distribution in the optical fiber of the present invention. In the first embodiment of the present invention, the refractive index profile as shown in FIG. 2, generally called a W+segment core type refractive index profile, which is relatively simple in construction and whose refractive index structure can be designed and controlled easily, is employed.

The optical fiber according to the first embodiment of the present invention comprises a core 4 and a clad 5 covering the outer circumference of the core 4. The core 4 includes a first core (center core) layer 1 having a refractive index larger than that of the clad 5, a second core (side core) layer 2 arranged to cover the outer circumference of the first core layer 1, and a third core (segment core) layer 3 arranged to cover the outer circumference of the second core. The second core layer 2 is contiguous to the first core layer 1, and the third core layer 3 is contiguous to the second core layer 2.

The second core layer 2 provides a depressed layer having a refractive index smaller than that of the clad 5, and the refractive index of the third core layer 3 is larger than that of the clad 5 and smaller than that of the first core layer 1.

The first core layer 1 has an α-exponential refractive index profile. The relative refractive index difference Δ1 of the first core layer 1 with the clad 5 is not smaller than 1.8%, and the relative refractive index difference Δ2 of the second core layer 2 with the clad 5 is −0.6% or less. Preferably, the relative refractive index difference Δ2 should be not larger than −0.7%. Further, the relative refractive index difference Δ3 of the third core layer 3 with the clad 5 falls within a range of between 0.1% and 0.6%.

In the present specification, the relative refractive index differences Δ1, Δ2 and Δ3 are defined by formulas (1), (2) and (3) given below, respectively:

$$\Delta 1 = \{(n_{c1}-n_s)/n_{c1}\}\times 100 \quad (1)$$

$$\Delta 2 = \{(n_{c2}-n_s)/n_{c2}\}\times 100 \quad (2)$$

$$\Delta 3 = \{(n_{c3}-n_s)/n_{c3}\}\times 100 \quad (3)$$

where $n_{c1}$ represents the refractive index of that portion of the first core layer 1 which has the largest refractive index, $n_{c2}$ represents the refractive index of that portion of the second core layer 2 which has the smallest refractive index, $n_{c3}$ represents the refractive index of that portion of the third core layer 3 which has the largest refractive index, and $n_s$ represents the refractive index of the clad 5.

Further, in the optical fiber according to the first embodiment of the present invention, the outer diameter 2a of the first core layer 1 is between 0.15 and 0.45 times the outer diameter 2b of the second core layer 2, and the outer diameter 2c of the third core layer 3 is between 1.2 and 1.8 times the outer diameter 2b of the second core layer 2.

The optical fiber according to the first embodiment of the present invention has the refractive index profile described above and is constructed as follows. Specifically, at the wavelength of 1590 nm, the optical fiber according to the first embodiment of the present invention has a value of the ratio between the dispersion and the dispersion slope, between 50 nm and 150 nm, a bend loss (of a diameter 20 mm) not larger than 10 dB/m, a wavelength dispersion not larger than −30 ps/nm/km, and a transmission loss not larger than 1.0 dB/km.

Also, the optical fiber according to the first embodiment of the present invention has a cutoff wavelength not longer than 1565 nm in the fiber length of 2 m. Incidentally, the cutoff wavelength referred to in the present specification represents the value under the fiber length of 2 m unless otherwise specified particularly.

The present inventors paid attentions to the situations given below in manufacturing the optical fiber according to the first embodiment of the present invention described above.

First of all, the NZ-DSF performing the function of an optical path and the optical fiber according to the first embodiment of the present invention performing the function of the Dispersion Slope Compensating optical fiber are set to have the same length so that the absolute values of the dispersion of these two optical fibers are equal, though the is opposite to each other. In this case, the present inventors considered forming the optical fiber according to the first embodiment of the present invention such that the DPS of the NZ-DSF would be substantially equal to the DPS of said optical fiber.

If the optical fiber according to the first embodiment of the present invention is formed in this fashion, the said optical fiber permits compensating substantially 100% for both the dispersion and the dispersion slope of the NZ-DSF in the L-band.

Incidentally, the effective core cross sectional area of the NZ-DSF in the L-band is about 50 μm² in general. If this is to be expanded to 80 μm², which is substantially equal to the effective core cross sectional area of the single mode optical fiber, the dispersion slope is increased to 0.08 ps/nm²/km or more.

If the dispersion is set at about 5 ps/nm/km at the wavelength of 1550 nm in the high dispersion slope NZ-DSF of this kind, the dispersion at the wavelength of 1590 nm, which is the wavelength about the center of the wavelengths of the L-band, is about 8 to 9 ps/nm/km.

If the dispersion value and the dispersion slope of the high dispersion slope NZ-DSF in the L-band are set at 9 ps/nm/km and 0.09 ps/nm²/km, respectively, the DPS (Dispersion Per Slope) obtained from these representative values is about 100 nm.

The optical fiber according to the first embodiment of the present invention has the DPS value in between 50 nm and 150 nm at the wavelength of 1590 nm as described above. On the other hand, the DPS value of the high dispersion slope NZ-DSF in the L-band is 100 nm. It follows that the optical fiber according to the first embodiment of the present invention permits effective compensating for both the dispersion and the dispersion slope of the high dispersion slope NZ-DSF in the L-band.

It should also be noted that the optical fiber according to the first embodiment of the present invention has a cutoff wavelength not longer than 1565 nm in the fiber length of 2 m as described previously and, thus, is capable of performing the single mode operation in the L-band.

Incidentally, the cutoff wavelength should desirably be as short as possible. In view of the application of the optical fiber according to the first embodiment of the present invention to the technology such as Raman amplification, it is desirable for the cutoff wavelength to be not longer than 1450 nm.

Further, in the optical fiber according to the first embodiment of the present invention, the bend loss at the diameter of 20 mm is set at 10 dB/m or less at the wavelength of 1590 nm. Therefore, it is possible to suppress the bend loss at the wavelength of 1590 nm to a small value, and it is possible to suppress the increase in the loss even if the said optical fiber is formed into a coil so as to prepare an optical fiber module. Incidentally, it is desirable for the bend loss to be as small as possible. To be more specific, a high reliability can be obtained with decrease in the bend loss.

Further, the length of the Dispersion Slope Compensating optical fiber is determined by the ratio of the dispersion of the NZ-DSF to that of the Dispersion Slope Compensating optical fiber. Therefore, if the absolute value of the dispersion of the Dispersion Slope Compensating optical fiber is excessively small, the increase in the length of the optical fiber is unavoidable so as to invite, for example, an expansion of the module size. The dispersion value of the NZ-DSF in the L-band of the high dispersion slope type NZ-DSF is about 6 to 12 ps/nm/km.

Since the wavelength dispersion value of the optical fiber according to the first embodiment of the present invention is set at −30 ps/nm/km at the wavelength of 1590 nm as described above, the absolute value of the wavelength dispersion is not smaller than 30 ps/nm/km. In other words, the optical fiber according to the first embodiment of the present invention has a dispersion absolute value at least 5 times as large as that of the high dispersion slope type NZ-DSF. It follows that the optical fiber according to the first embodiment of the present invention is capable of compensating for the dispersion and the dispersion slope of the high dispersion slope type NZ-DSF with a short length.

Incidentally, if the representative value of the absolute value of the dispersion of the high dispersion slope type NZ-DSF at the wavelength of 1590 nm is supposed to be 9 ps/nm/km, it is desirable for the dispersion value of the optical fiber according to the first embodiment of the present invention to be not larger than −45 ps/nm/km at the wavelength of 1590 nm.

Of course, it is desirable for the absolute value of the dispersion to be large if the other characteristics are the same because the large absolute value of the dispersion permits diminishing of the module size.

Incidentally, the present inventors have conducted a research as follows in order to specify the refractive index profile of the optical fiber according to the first embodiment of the present invention. Specifically, the present inventors selected first the W type refractive index profile shown in FIG. 3 whose refractive index structure can be designed and controlled easily, as the refractive index profile of the optical fiber according to the first embodiment of the present invention, and studied in detail the refractive index profile of the optical fiber.

The optical fiber having the W type refractive index profile is known to the art as a structure advantageous for lowering the dispersion slope by optimizing the second core layer 2 providing the depressed layer.

The W type refractive index profile has the following parameters: the relative refractive index difference Δ1 of the first core layer 1 with the clad 5, the relative refractive index difference Δ2 of the second core layer 2 with the clad 5, the diameter (Ra) of the first core layer 1 when the outer diameter of the second core layer 2 is set to be one, the α-value when the shape of the first core layer 1 is approximated with an α-exponential, and the diameter (outer diameter 2b of the second core layer 2) of the core 4.

Among these parameters, the relative refractive index difference Δ2 and the value of Ra, which is the diameter of the first core layer 1 when the diameter (outer diameter) of the second core layer 2 is set to be one, give particularly serious effects to the DPS.

Under the circumstances, the present inventors set the relative refractive index difference Δ1 of the clad 5 with the first core layer 1 at 2.0% and also set the value of α noted above at 2.0 in the optical fiber having the W type refractive index profile noted above. Also, the outer diameter 2b of the second core layer 2 was set in a manner to allow the bend loss at the diameter of 20 mm to be 5.0 dB/m at the wavelength of 1590 nm. Under these conditions, the change in the DPS value at the wavelength of 1590 nm was obtained by changing the values of Δ2 and Ra.

Figure 4:
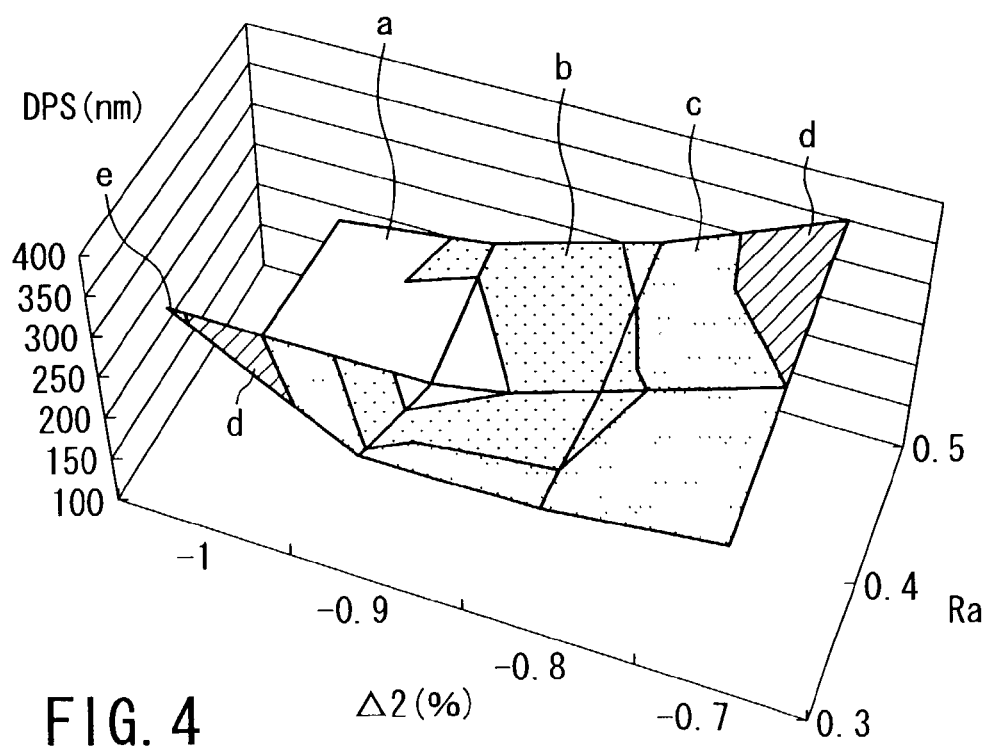
FIG. 4 is a graph showing the relationship among the relative refractive index difference Δ2, the value of Ra and DPS in an optical fiber having a W-type refractive index profile.

FIG. 4 is a graph showing the results. As shown in the drawing, the graph includes the following regions of "a", "b", "c", "d" and "e" in which the DPS falls within a range of between 150 nm and 200 nm, between 200 nm and 250 nm, between 250 nm and 300 nm, between 300 nm and 350 nm, and between 350 nm and 400 nm, respectively.

As shown in FIG. 4, changing the value of Δ2 and Ra can markedly change the DPS. However, it was difficult in the study noted above to allow the DPS to be smaller than 150 nm. In other words, it has been found that, when the relative refractive index difference Δ1, the value of α and the core diameter 2b are determined to be the values noted above, it is difficult to allow the bend loss at the diameter 20 mm to be 5.0 dB/m at the wavelength of 1590 nm and allow the DPS at the wavelength of 1590 nm to be smaller than 150 nm.

Under the circumstances, optimizing Δ1, Δ2, α-value and "Ra", the present inventors have found that, if the relative refractive index difference Δ1 is between 2.0% and 2.4%, the relative refractive index difference Δ2 is between −1.2% and −1.0%, the α-value is 6 or more, and the Ra is around 0.28 to 0.35, then it is possible to allow the DPS at the wavelength of 1590 nm to be not larger than 150 nm, the bend loss noted above to be not larger than 10 dB/m, and the cutoff wavelength to be not longer than 1550 nm.

However, in the optical fiber having the W type refractive index profile, it was impossible to find the range within which the DPS at the wavelength of 1590 nm is allowed to be not larger than 100 nm. It has been found that, if the DPS at the wavelength of 1590 nm is allowed to be not larger than 100 nm in the optical fiber having the W type refractive index profile, the cutoff wavelength is rendered larger than 1565 nm or the bend loss at the diameter 20 mm is rendered larger than 10 dB/m.

Such being the situation, the means to reduce the DPS at the wavelength of 1590 nm were studied in respect of an optical fiber having the W+side core type refractive index profile, in which the third core layer 3 was arranged to surround the outer circumference of the second core 2 as shown in FIG. 2.

As a result, by the inclusion of third core layer 3, the optical fiber was found to be rendered capable of preventing the cutoff wavelength from being increased to exceed 1565 nm and of suppressing the increase of the bend loss, by optimizing the refractive index profile even if the DPS at the wavelength of 1590 nm is limited to not larger than 100 nm.

The study on the optimization of the refractive index profile shown in FIG. 2 will now be described. First of all, while changing the relative refractive index difference Δ2 of the second core layer 2 with the clad 5, all of the other parameters were optimized. Table 1 shows the results of the study. The relationship between the relative refractive index difference Δ2 and the DPS at the wavelength of 1590 nm with the bend loss at the diameter of 20 mm at the wavelength of 1590 nm set at 5 dB/m was obtained in this study. The unit of Δ2 is %, and the unit of the DPS is nm.

TABLE 1

| Δ2 | −0.5 | −0.6 | −0.7 | −0.8 | −0.9 | −1.0 |
|---|---|---|---|---|---|---|
| DPS range | 1700–190 | 1300–150 | 1100–130 | 1000–110 | 900–100 | 700–95 |

As apparent from Table 1, if the relative refractive index difference Δ2 is set at −0.7% or less, then the DPS at the wavelength of 1590 nm can be set at 150 nm or less, and the bend loss at the diameter 20 mm can be set at 10 dB/m.

Such being the situation, the relative refractive index difference Δ2 is set at −0.6% or less, preferably −0.7% or less, in the optical fiber according to the first embodiment of the present invention, as described above.

As shown in Table 1, the relative refractive index difference Δ2 gives a serious effect to the DPS. To be more specific, it is more desirable for the relative refractive index difference Δ2 to be decreased to −0.8%, −0.9% and −1.0% (i.e., the absolute value of the relative refractive index difference Δ2 is increased). By diminishing the relative refractive index difference Δ2, the DPS can be set at about 100 nm.

As described above, the optical fiber according to the first embodiment of the present invention has a W+side core type refractive index profile and is enabled to compensate for the dispersion value of the high dispersion slope NZ-DSF by increasing the absolute value of the relative refractive index difference Δ2.

It should be noted, however, that the DPS is not determined in a unitary fashion by the value of the relative refractive index difference Δ2 alone. Since it is possible for the DPS to assume a very wide range, it is important to optimize the other parameters, too, in order to obtain the DPS smaller than that in the conventional Dispersion Slope Compensating optical fiber.

For example, it is possible to obtain a target value of the DPS, while maintaining the low bend loss characteristics, by setting the relative refractive index difference Δ1 at 1.8% or more. If the relative refractive index difference Δ1 is set to be lower than 1.8%, the bend loss at the diameter of 20 mm becomes larger than 10 dB/m when the DPS at the wavelength of 1590 nm is diminished.

It should also be noted that the bend loss at the diameter of 20 mm at the wavelength of 1590 nm can be set at 10 dB/m or less by setting the relative refractive index difference Δ3 at 0.1% or more. It is also possible to set the cutoff wavelength at 1565 nm or less by setting the relative refractive index difference Δ3 at 0.6%.

Further, the bend loss at the diameter of 20 mm at the wavelength of 1590 nm can be set at 10 dB/m or less by allowing the diameter (2a) of the first core layer 1 to be at least 0.15 times of the diameter of the second core layer 2 (diameter 2b shown in FIG. 2). Also, the DPS at the wavelength of 1590 nm can be set at 150 nm or less by allowing the diameter of the first core layer 1 to be at most 0.45 times of the diameter of the second core layer 2.

Further, the bend loss at the diameter of 20 mm at the wavelength of 1590 nm can be set at 10 dB/m or less by allowing the diameter (2c) of the third core layer 3 to be at least 1.2 times of the diameter of the second core layer 2 (diameter 2b shown in FIG. 2). Also, the cutoff wavelength can be set at 1565 nm or less by allowing the diameter of the third core layer 3 to be at most 1.8 times of the diameter of the second core layer 2.

Under the circumstances, the refractive index profile and the ratio of the core diameters have been determined as above in the first embodiment of the present invention.

Table 2 shows the refractive index profiles and the characteristics obtained by the simulation performed on the basis of the study described above in respect of specific examples of the optical fiber according to the first embodiment of the present invention.

longer than 1450 nm and the bend loss under the diameter of 20 mm not larger than 10 dB/m by optimizing the refractive index profile shown in FIG. 2. It should also be noted that each of the optical fibers shown in Table 2 has an effective core cross sectional area much smaller than that of the DCF (dispersion compensated optical fiber for the single mode optical fiber) and, thus, exhibits a high non-linearity, with the result that it is possible to expect good amplifying characteristics when the optical fiber shown in Table 2 is used as a Raman amplifying medium.

It follows that, if the optical fiber shown in Table 2 is connected to a high dispersion slope type NZ-DSF, it is possible to achieve a low dispersion of a wide band in the L-band.

Examples of the first embodiment of the present invention will now be described. Specifically, an optical fiber was manufactured on the trial basis (trial manufacture Example 1) in an attempt to achieve the second example shown in

TABLE 2

| $\Delta 1$ % | $\alpha$ | $\Delta 2$ % | $\Delta 3$ % | a:b:c | Core diameter $\mu m$ | Dispersion ps/nm/km | DPS nm | $A_{eff}$ $\mu m^2$ | $\lambda c$ nm | Bending loss dB/m |
|---|---|---|---|---|---|---|---|---|---|---|
| 2.2 | 2.2 | −0.70 | 0.30 | 0.35:1:1.55 | 9.6 | −124 | 136 | 12.9 | 1398 | 3.0 |
| 2.3 | 2.5 | −0.80 | 0.25 | 0.38:1:1.70 | 9.4 | −141 | 127 | 12.4 | 1413 | 4.0 |
| 2.2 | 2.7 | −0.80 | 0.30 | 0.34:1:1.50 | 9.0 | −119 | 111 | 12.1 | 1393 | 6.0 |
| 2.3 | 2.1 | −0.90 | 0.29 | 0.34:1:1.58 | 8.3 | −107 | 107 | 11.4 | 1403 | 5.0 |
| 2.4 | 2.3 | −0.90 | 0.25 | 0.39:1:1.68 | 8.4 | −134 | 104 | 11.8 | 1413 | 5.0 |
| 2.3 | 2.8 | −1.00 | 0.25 | 0.37:1:1.65 | 9.0 | −103 | 101 | 11.2 | 1321 | 6.0 |
| 2.2 | 2.5 | −1.00 | 0.20 | 0.38:1:1.70 | 8.7 | −98 | 100 | 11.1 | 1233 | 4.0 |

The experimental data given in Table 2 represent the result of the simulation of the refractive index profile capable of achieving the satisfactory characteristics while setting the DSP at 150 nm or less and setting the dispersion value at the wavelength of 1590 nm at −30 ps/nm/km or less in order to set the DSP at the wavelength of 1590 nm at 100 nm or less.

Table 2, i.e., the example having the relative refractive index difference $\Delta 1$ of 2.3%, the $\alpha$-value of 2.5, the relative refractive index difference $\Delta 2$ of −0.80%, the relative refractive index difference $\Delta 3$ of 0.25%, the a:b:c ratio of 0.38:1:1.7, and the core diameter of 9.4 μm. The characteristics of the optical fiber for trial manufacture Example 1 are shown in the row of "No. 1" in Table 3 given below:

TABLE 3

| No. | Dispersion ps/nm/km | Dispersion slope ps/nm²/km | DPS nm | Transmission loss dB/km | $A_{eff}$ $\mu m^2$ | $\lambda c$ nm | Bending loss dB/m | PMD ps/√km |
|---|---|---|---|---|---|---|---|---|
| 1 | −147 | −1.19 | 124 | 0.54 | 12.1 | 1426 | 2.6 | 0.08 |
| 2 | −106 | −1.08 | 98 | 0.56 | 11.9 | 1353 | 3.0 | 0.09 |

In Table 2 and in the following Tables, the core diameter represents the diameter (2b) of the second core layer 2, the dispersion represents the dispersion value at the wavelength of 1590 nm, the $A_{eff}$ represents the effective core cross sectional area at the wavelength of 1590 nm, $\lambda c$ represents the cutoff wavelength, and the bend loss represents the bend loss at the diameter of 20 mm at the wavelength of 1590 nm.

In almost all the optical fibers shown in Table 2, the dispersion value at the wavelength of 1590 nm is not larger than −100 ps/nm/km. Also, in almost all the optical fibers shown in Table 2, the bend loss at the diameter of 20 mm can be set at a small value of 10 dB/m or less at the wavelength of 1590 nm while setting the cutoff wavelength at 1565 nm or less (substantially 1420 nm or less).

As described above, it has been found that it is possible to achieve simultaneously both the cutoff wavelength not Also, another optical fiber was manufactured on the trial basis (trial manufacture Example 2) in an attempt to achieve the sixth example from the above shown in Table 2, i.e., the example having $\Delta 1$ of 2.3%, the $\alpha$-value of 2.8, $\Delta 2$ of −1.00%, $\Delta 3$ of 0.25%, the a:b:c ratio of 0.37:1:1.65, and the core diameter of 9.0 μm. The characteristics of the optical fiber for trial manufacture Example 2 are shown in the row of "No. 2" in Table 3 given above.

In Table 3, the transmission loss and PMD represent the transmission loss and the polarization mode dispersion at the wavelength of 1590 nm, respectively at the wavelength. As apparent from Table 3, the optical fiber for each of the trial manufacture Examples 1 and 2 exhibits good dispersion characteristics and good nonlinear characteristics equivalent to those in the result of the simulation. In other words, the optical fiber for each of the trial manufacture Examples 1 and 2 makes it possible to obtain the DPS of about 100 nm while lowering the cutoff wavelength to 1450 nm or less and lowering the bend loss to 10 dB/m or less.

It has also been found that the optical fiber for each of trial manufacture Examples 1 and 2 has a small transmission loss of about 0.55 dB/m at the wavelength of 1590 nm and the transmission loss can be maintained at substantially this level within the wavelength range of up to 1625 nm. Further, it has also been confirmed that the optical fiber for each of the trial manufacture Examples 1 and 2 is satisfactory in each of the effective core cross sectional area and the value of the polarization dependent loss. It follows that these optical fibers can be used for manufacturing an optical fiber module and can be applied to the Raman amplification technology.

Incidentally, the first embodiment of the present invention is not limited to the examples described above and can be modified in various fashions. For example, in the optical fiber according to the first embodiment described above, the core 4 comprises three core layers including the first core layer 1, the second core layer 2 and the third core layer 3. However, it is possible for the optical fiber of the present invention to comprise a core having four or more core layers.

Figure 3:
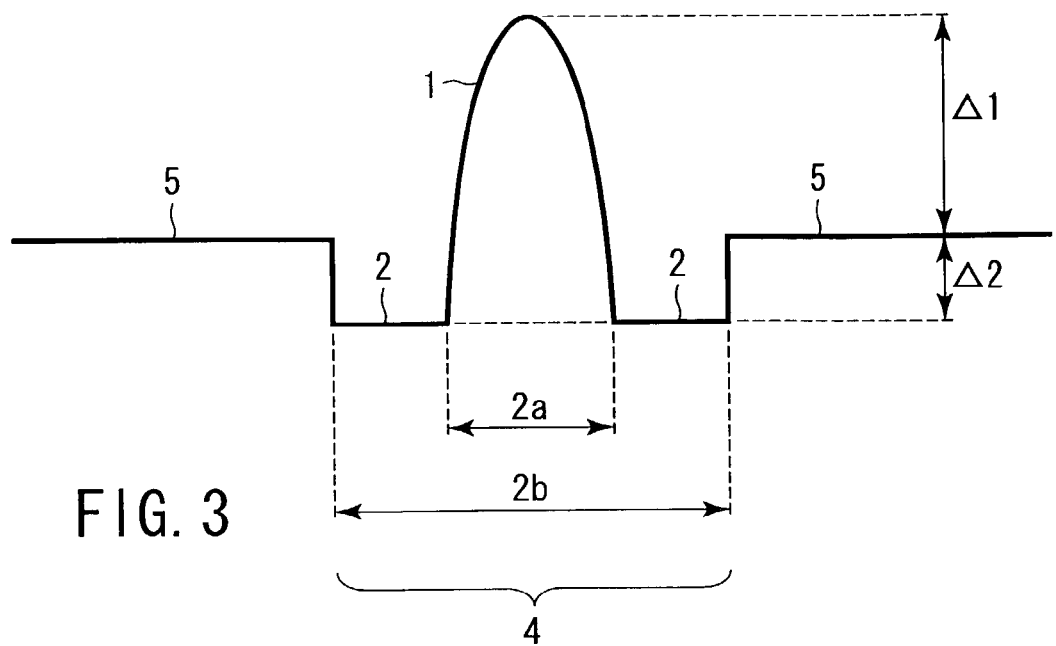
FIG. 3 shows a W-type refractive index profile according to another embodiment of the present invention.

Also, it is possible for the optical fiber according to the first embodiment of the present invention to exhibit a so-called "W type refractive index profile" as shown in FIG. 3, though the third core layer 3 is omitted in the example described above. In the case of the W type refractive index profile, it is difficult to limit the DPS at the wavelength of 1590 nm to be 100 nm or less. However, it is possible to enhance the productivity of the optical fiber.

Also, in the optical fiber according to the first embodiment of the present invention, it is desirable for the parameters such as the bend loss at the wavelength of 1590 nm, the dispersion loss and the transmission loss to fall within the ranges exemplified above. However, it is possible for these parameters to be slightly deviated from the ranges noted above.

In the optical fiber according to the first embodiment of the present invention, the DPS in the L-band is close to the DPS in the L-band of the high dispersion slope type NZ-DSF. It follows that the optical fiber according to the first embodiment of the present invention permits efficiently compensating for both the dispersion and the dispersion slope of the high dispersion slope type NZ-DSF in the L-band.

Also, if the cutoff wavelength at the fiber length of 2 m is set at 1565 nm or less in the optical fiber according to the first embodiment of the present invention, it is possible to realize the single mode without fail so as to perform the function described above.

Further, if the bend loss at the diameter of 20 mm at the wavelength of 1590 nm is set at 10 dB/m or less in the optical fiber according to the first embodiment of the present invention, it is possible to suppress the bend loss and, thus, it is possible to suppress, for example, the deterioration of the characteristics when the optical fiber is wound in the form of a coil in manufacturing an optical fiber module.

Further, if the dispersion value at the wavelength of 1590 nm is set at −30 ps/nm/km or less in the optical fiber according to the first embodiment of the present invention, it is possible to compensate efficiently for the dispersion of the NZ-DSF in the L-band with a short length.

Further, if the refractive index profile of the optical fiber is specifically set according to the first embodiment of the present invention, it is possible to obtain without fail the optical fiber producing the excellent effects described above.

Further, if the transmission loss at the wavelength of 1590 nm is set at 1.0 dB/km or less in the optical fiber according to the first embodiment of the present invention, it is possible to suppress the transmission loss in the L-band, so as to suppress the transmission loss of the optical transmission system prepared by connecting the optical fiber of the present invention to an NZ-DSF.

Further, since the optical fiber module using an optical fiber according to the first embodiment of the present invention includes an optical fiber generating the prominent effects described above, it is possible to provide, for example, a dispersion compensating optical fiber module of a low loss, which permits efficiently compensating for the dispersion and the dispersion slope of the NZ-DSF in the L-band.

Still further, the optical amplifier using an optical fiber according to the first embodiment of the present invention permits, for example, efficiently compensating for the dispersion and the dispersion slope of the NZ-DSF in the L-band and is adapted for, for example, a Raman amplification.

A second embodiment of the present invention will now be described.

An optical fiber according to the second embodiment of the present invention has a refractive index profile as shown in FIG. 2 like the optical fiber according to the first embodiment of the present invention described above. It should be noted, however, that, in the α-exponential refractive index profile of the first core layer 1, the α-value is between 1.5 and 15, the relative refractive index difference $\Delta 1$ of the first core layer 1 based on the clad 5 is between 1.8% and 2.8%, the relative refractive index difference $\Delta 2$ of the second core layer 2 based on the clad 5 is not larger than −0.7%, and the relative refractive index difference $\Delta 3$ of the third core layer 3 based on the clad 5 is between 0.2% and 0.6%. It is more desirable for the relative refractive index difference $\Delta 2$ to be not larger than −0.8%.

Also, in the optical fiber according to the second embodiment of the present invention, the outer diameter 2a of the first core layer 1 is between 0.20 and 0.45 times of outer diameter 2b of the second core layer 2, and the outer diameter 2c of the third core layer 3 is between 1.3 and 1.8 times of the outer diameter 2b of the second core layer 2.

The optical fiber according to the second embodiment of the present invention has the refractive index profile described above and is constructed as follows. Specifically, the optical fiber according to the second embodiment of the present invention has various values at the wavelength of 1550 nm such that the value of the ratio between the dispersion value and the dispersion slope is between 30 nm and 80 nm, the bend loss at the diameter 20 mm is not smaller than 10 dB/m, the wavelength dispersion value is not larger than −40 ps/nm/km, and the transmission loss is not larger than 1.0 dB/km.

In the optical fiber according to the second embodiment of the present invention, the cutoff wavelength at the fiber length of 2 m is not longer than 1500 nm.

The optical fiber according to the second embodiment of the present invention is constructed as described above. In manufacturing the optical fiber according to the second embodiment of the present invention, the present inventors paid attentions to the situation described below.

First of all, the lengths of the NZ-DSF performing the function of an optical path and the optical fiber according to the second embodiment of the present invention performing the function of the Dispersion Slope Compensating optical fiber are set in a manner to permit the absolute value of the dispersion of these two optical fibers to be equal at the wavelength of 1.55 μm band, though the direction of the dispersion of these two optical fibers are opposite to each other. In this setting, the present inventors considered forming the optical fiber according to the second embodiment of the present invention in a manner to permit the DPS of the NZ-DSF to be substantially equal to the DPS of the said optical fiber.

If the optical fiber according to the second embodiment of the present invention is formed as described above, the said optical fiber permits simultaneously compensating substantially 100% both the dispersion and the dispersion slope of the NZ-DSF at the wavelength of 1.55 μm band.

In general, the effective core cross sectional area of the NZ-DSF at the wavelength of 1.55 μm band is about 50 μm$^2$. If this value of the effective core cross sectional area is to be expanded to 80 μm$^2$, which is substantially equal to that of the single mode optical fiber, the dispersion slope is about 0.08 to 0.10 ps/nm$^2$/km. This brings about a serious problem of a difference in the dispersion between wavelengths.

If the dispersion value at the wavelength of 1550 nm is about 5 ps/nm/km and the dispersion slope is about 0.09 ps/nm$^2$/km in the high dispersion slope NZ-DSF, the relationship between the wavelength and the dispersion is as shown in Table 4 given below. Also, the dispersion value/ dispersion slope of the high dispersion slope NZ-DSF at the wavelength of 1550 nm, which is obtained from the representative values of the dispersion and the dispersion slope, i.e., DPS (Dispersion Per Slope), is about 55 nm.

TABLE 4

| Wavelength (nm) | 1535 | 1540 | 1545 | 1550 | 1555 | 1560 | 1565 |
|---|---|---|---|---|---|---|---|
| Dispersion (ps/nm/km) | 3.65 | 4.10 | 4.55 | 5.00 | 5.45 | 5.90 | 6.35 |

Where the allowable range of the dispersion in, for example, the wavelength division multiplexing transmission system is not higher than 6 ps/nm/km, the dispersion value falls within the allowable range at the wavelength of 1550 nm, as shown in Table 4. However, the dispersion value exceeds the allowable range at the wavelength of 1565 nm.

It follows that, at the wavelength of 1.55 μm band, it is indispensable to compensate for the dispersion and the dispersion slope of the high dispersion slope NZ-DSF. In order to compensate substantially 100% for the dispersion and the dispersion slope of the high dispersion slope NZ-DSF, it is desirable for the DPS of the said dispersion compensating optical fiber to be not larger than 80 nm at the wavelength of 1550 nm.

By contraries, if the DPS is excessively small so as to give rise to the over-compensation, the optical fiber is caused to have a negative dispersion slope. Therefore, it is desirable for the DPS at the wavelength of 1550 nm to be not smaller than 30 nm.

Incidentally, in view of the fact that the DPS of the conventional single mode optical fiber is 270 nm and the DPS of the low dispersion slope type NZ-DSF is about 110 nm at the wavelength of 1550 nm, it is difficult to design an optical fiber capable of simultaneously compensating for both the dispersion and the dispersion slope of the high dispersion slope NZ-DSF.

In the optical fiber according to the second embodiment of the present invention, the DPS at the wavelength of 1550 nm is between 30 nm and 80 nm, and the DPS of the high dispersion slope NZ-DSF at the wavelength of 1550 nm is about 55 nm. It follows that the optical fiber according to the second embodiment of the present invention is capable of efficiently compensating for the dispersion and the dispersion slope of the high dispersion slope NZ-DSF at the wavelength of 1.55 μm band.

Also, in the optical fiber according to the second embodiment of the present invention, the cutoff wavelength at the fiber length of 2 m is not longer than 1500 nm, with the result that the optical fiber is capable of performing a single mode operation at the wavelength of 1.55 μm band.

Incidentally, the cutoff wavelength should desirably be as short as possible. In view of the application of the optical fiber according to the second embodiment of the present invention to the technology of, for example, Raman amplification, it is more desirable for the cutoff wavelength to be not longer than 1450 nm.

Further, in the optical fiber according to the second embodiment of the present invention, the bend loss at the diameter of 20 mm is set at 10 dB/m or less at the wavelength of 1550 nm to enable it to suppress the bend loss at the wavelength of 1550 nm, to a small value. It follows that it is possible to suppress the increase of the loss even if the said optical fiber is shaped in the form of a coil for preparation of an optical fiber module. Incidentally, the bend loss should desirably be as small as possible, and a high reliability can be obtained with decrease in the bend loss.

Further, since the length of the optical fiber compensating for the dispersion slope of the NZ-DSF is determined by the ratio of the dispersion of this fiber with that of the NZ-DSF, it is unavoidable to increase the length of the Dispersion Slope Compensating optical fiber, and consequently to expand the module size, if its dispersion is excessively small. The dispersion value of the high dispersion slope type NZ-DSF at the wavelength of 1.55 μm band is at most about 8 ps/nm/km.

In the optical fiber according to the second embodiment of the present invention, the wavelength dispersion value at the wavelength of 1550 nm is not smaller than −40 ps/nm/km and, thus, the absolute value of the wavelength dispersion is not smaller than 40 ps/nm/km. In other words, the said optical fiber has at least 5 times larger absolute value of the dispersion than the maximum dispersion value of the high dispersion slope type NZ-DSF. It follows that the optical fiber according to the second embodiment of the present invention is capable of compensating for the dispersion and the dispersion slope of the high dispersion slope type NZ-DSF with a short length.

Of course, it is desirable for the absolute value of the dispersion to be large if the other characteristics are the same, since it enables the decrease of the module size.

A third embodiment of the present invention will now be described.

In general, the NZ-DSF has a dispersion of about 4 to 8 ps/nm/km at the wavelength of 1.55 μm band (C-band). If the dispersion value is smaller than 4 ps/nm/km, the four wave mixing (FWM) phenomenon is brought about generating noise signals and, thus, deteriorating the transmission characteristics. On the other hand, if the dispersion exceeds 8 ps/nm/km, the distortion of the signal wave form caused by the dispersion value is rendered prominent if the transmission speed is excessively increased.

The era of high speed transmission has come, and the limitation of the dispersion value is rendered severer. Such being the situation, the NZ-DSF having a dispersion of about 4 to 6 ps/nm/km under the C-band is being vigorously studied.

In such an NZ-DSF, it is known to the art that the expansion of the effective core cross sectional area $A_{eff}$ and the dispersion slope has a trade-off relationship. For example, when the value of $A_{eff}$ of the NZ-DSF is increased to about 70 to 80 $\mu m^2$, which is substantially equal to that of the SMF, the dispersion slope is increased to about 0.08 to 0.10 ps/nm$^2$/km. This gives rise to a serious problem of a difference in the dispersion between wavelengths.

Table 5 shows the dispersion value for each wavelength of the $A_{eff}$ expansion type NZ-DSF having a dispersion slope of 0.09 ps/nm$^2$/km at 1.55 $\mu m$ and that of the low dispersion slope type NZ-DSF having a dispersion slope of 0.04 ps/nm$^2$/km at 1.55 $\mu m$, where the dispersion at the wavelength of 1550 nm is set at 5 ps/nm/km for both the types of fibers.

TABLE 5

| Wavelength (nm) | | 1535 | 1540 | 1545 | 1550 | 1555 | 1560 | 1565 |
|---|---|---|---|---|---|---|---|---|
| Dispersion (ps/nm/km) | $A_{eff}$ expansion type | 3.65 | 4.10 | 4.55 | 5.00 | 5.45 | 5.90 | 6.35 |
| | Low dispersion slope type | 4.40 | 4.60 | 4.80 | 5.00 | 5.20 | 5.40 | 5.60 |

As shown in Table 5, if, for example, the dispersion limit of the system is set at 6 ps/nm/km or less, the dispersion of the $A_{eff}$ expansion type NZ-DSF exceeds the limit at the wavelength of 1565 nm, though not exceeding at the wavelength of 1550 nm. Therefore, it is absolutely necessary to perform the dispersion compensation for the $A_{eff}$ expansion type NZ-DSF. Under the circumstances wherein the dispersion proof strength is rendered severer for achieving a high speed transmission, the compensation of the dispersion is required even in the low dispersion slope type NZ-DSF.

In this case, the technology of performing the dispersion compensation of the NZ-DSF in the station by using a DSFF is effective. However, the DSCF for compensating the high dispersion slope type NZ-DSF has scarcely been studied to date because a very small DPS is required for such dispersion compensating optical fiber. In general, the design of the dispersion compensating optical fiber is rendered difficult and the bend loss tends to be increased with decrease in the DPS. Also, an optical fiber for compensating the low dispersion slope type NZ-DSF has already been studied. However, the design for the optimization in view of even the Raman characteristics has not been performed. The third embodiment of the present invention is mainly intended to provide dispersion compensated optical fiber or a Dispersion Slope Compensating optical fiber (DSCF) having the Raman characteristics taken into consideration.

The Raman amplifying efficiency is proportional in general to the non-linearity of the optical fiber and, thus, it is effective for the effective core cross sectional area $A_{eff}$ to be smaller than that of the conventional DCF. It follows that, in the third embodiment of the present invention, it is necessary for $A_{eff}$ to be not larger than 13 $\mu m^2$. However, if $A_{eff}$ is excessively small, the nonlinear phenomenon within the optical fiber is not negligible. It follows that it is necessary for $A_{eff}$ to be not smaller than 8 $\mu m^2$.

If the absolute value of the dispersion of the DSCF according to the third embodiment of the present invention is excessively small, the module size is rendered large. Conventionally, the length of DCF is not longer than $\frac{1}{5}^{th}$ of the length of the SMF. Therefore, in order to permit the DSCF noted above to have a length not longer than $\frac{1}{5}^{th}$ of the length of the NZ-DSF, it is necessary for the DSCF according to the third embodiment of the present invention to have a dispersion value of not more than −20 ps/nm/km, which is at least 5 times the absolute value of dispersion of the NZ-DSF, typically 4 ps/nm/km. Also, in order to obtain a prescribed compensation rate, it is necessary for the said DSCF to have a dispersion slope not larger than −0.05 ps/nm$^2$/km whose absolute value is larger than that of the low dispersion slope NZ-DSF.

Further, it is very important for the said DSCF to have dispersion and dispersion slope characteristics opposite to the dispersion of the NZ-DSF. To be more specific, it is desirable to design the said DSCF such that, when the length of the DSCF is adjusted to have the dispersion value equal to that of the NZ-DSF, the DSCF has the dispersion slope substantially equal to that of the NZ-DSF and opposite in direction to that of the NZ-DSF, and the sum of the dispersion slopes is rendered close to zero (to obtain a dispersion flat line in the wide band). In other words, the dispersion/dispersion slope of the DSCF acting as a dispersion compensator should be coincident with the dispersion/dispersion slope of the NZ-DSF acting as a line.

As described above, the dispersion slope of the NZ-DSF having an expanded effective core cross sectional area $A_{eff}$ is 0.08 to 0.1 ps/nm$^2$/km at the wavelength of 1.55 $\mu m$ band. When the dispersion value at the wavelength of 1.55 $\mu m$ band is set at 5 ps/nm/km and the dispersion slope is set at 0.09 ps/nm$^2$/km, the DPS is lowered to about 55 nm. In view of the situation that the DPS of the conventional SMF is 270 nm and the DPS of the low dispersion slope type NZ-DSF is about 110 nm, it is easy to understand that it is very difficult to develop a dispersion compensator for the $A_{eff}$ expansion type NZ-DSP. However, for substantially 100% of compensation of the C-band, it is desirable for the DPS at the wavelength of 1550 nm to be not larger than 80 nm. The following description is directed to the dispersion compensation of the high dispersion slope type NZ-DSF. However, it is desirable for the DPS to be not larger than 150 nm because it is possible to optimize the dispersion compensator of the low dispersion slope type NZ-DSF for application to the Raman amplification by optimizing the effective core cross sectional area $A_{eff}$. On the other hand, in the case of the over-compensation, the NZ-DSF is caused to have a negative dispersion slope by contraries. Such being the situation, it is desirable for the DPS to be not smaller than 30 nm.

Of course, if the bend loss at the wavelength of 1550 nm is large, an increase in the transmission loss is brought about when the optical fiber is wound to form a coil having a small barrel diameter in preparing an optical fiber module. It follows that it is desirable for the bend loss to be small. Since the development of the technology for preparation of an optical fiber module is also making a progress, a small bend loss not larger than 5 dB/m at the diameter of 20 mm is not necessarily required as in the conventional DCF. However, if the bend loss is excessively large, it is impossible to deal with the optimization in the preparation of an optical fiber module. Such being the situation, it is desirable for the bend loss to be not larger than 20 dB/m at the diameter of 20 mm.

It is also important to pay attentions to the cutoff wavelength $\lambda_{cc}$, which is the cutoff wavelength at the cable length of provisionally 22 m because the optical fiber actually used has a length of at least 22 m. It is desirable for the cutoff wavelength $\lambda_{cc}$ to be not longer than 1550 nm. In this case, the SM operation can be compensated during the actual use of the cable at the wavelength used of at least 1550 nm. Of course, in the case of using a wavelength of, for example, 1530 nm to 1570 nm in view of the use of the WDM transmission, obviously, it is necessary for the cutoff wavelength $\lambda_{cc}$ to be not longer than 1530 nm.

When the Raman amplification is taken into consideration, the wavelength further shorter by about 100 nm than the wavelength used is applied as the excitation band. Therefore, in the case where a wavelength of 1430 nm to 1470 nm is used as the excitation band for the signal transmission under a wavelength of, for example, 1530 nm to 1570 nm, it is desirable for the cutoff wavelength $\lambda_{cc}$ to be not longer than 1430 nm.

In order to study whether or not the dispersion compensating optical fiber according to the third embodiment of the present invention is capable of achieving the DPS falling within the range noted above, i.e., 30 to 80 nm, the optimization was performed by selecting the W type refractive index profile as shown in FIG. 3. It is known to the art that the W type refractive index profile, which is a relatively simple structure, is a structure capable of obtaining a large negative dispersion slope by the control of the dispersion of the structure by optimizing the depressed layer.

The parameters of the W type structure includes the relative refractive index difference $\Delta 1$ of the first core (center core) 1 with the clad 5, the relative refractive index difference $\Delta 2$ of the second core (side core) 2 with the clad 5, the diameter Ra of the first core (center core) 1 when the outer diameter of the second core (side core) 2 is set to be 1, the α-value in the case where the shape of the first core (center core) 1 is approximated by the α-exponential, and the outer diameter 2b of the second core (side core) 2. Particularly, the relative refractive index difference $\Delta 2$ of the second core (side core) 2 with the clad 5 imparts a serious effect to the value of the DPS. Under the circumstances, the present inventors have optimized the other parameters while changing $\Delta 2$, finding that the situation of DPS<80 nm (1550 nm) is present only when $\Delta 2$ is not larger than −0.7%. It has been found that, if $\Delta 2$ exceeds −0.7%, the DPS is increased to exceed 80 nm in spite of the optimization of the other parameters. Table 6 shows the distribution range of the DPS at the wavelength of 1550 nm relative to the value of $\Delta 2$ when each parameter is changed.

TABLE 6

| $\Delta 2$ (%) | −0.4 | −0.5 | −0.6 | −0.7 | −0.8 | −0.9 | −1.0 |
|---|---|---|---|---|---|---|---|
| DPS range | 2700–150 | 2000–130 | 1700–100 | 1400–80 | 1200–60 | 900–50 | 700–45 |

As described above, it has been found that it is possible to lower the DPS at the wavelength of 1550 nm to 80 nm or less in the W type refractive index profile by forming the second core (side core) 2 to have $\Delta 2$ not larger than −0.7%. If $\Delta 2$ exceeds −0.7%, the DPS at the wavelength of 1550 nm exceeds 80 nm even if the other parameters are optimized.

Under the circumstances, the present inventors decided to optimize the other parameters such as $\Delta 1$, the α-value, and the core diameter 2b in the W type refractive index profile while setting $\Delta 2$ at −0.7%. In this case, however, it has been found that the bend loss at the diameter of 20 mm is increased to 20 dB/m or more at the wavelength of 1550 nm even if the parameters noted above are optimized.

Under the condition that the DPS is not longer than 150 nm, it has been found that $\Delta 2$ should desirably be not larger than −0.4%. It should be noted, however, that, wherever $\Delta 2$ is between −0.4% and −0.7%, the effective core cross sectional area $A_{eff}$ tends to increase. It follows that it is important for $A_{eff}$ to be not larger than 13 μm² under the condition that the other parameters are optimized to meet the requirement in the third embodiment of the present invention.

Wherever the DPS is not longer than 150 nm, the bend loss tends to be relatively lowered even in the W type profile. Nevertheless, the value of the bend loss is somewhat larger than desired in practice.

On the other hand, the structure prepared by adding the third core layer 3 to the outer circumference of the second core layer 2 as shown in FIG. 3 produces the effect of suppressing the increase of the bend loss even if the DPS is lowered. Such being the situation, it was decided to optimize the W+segment core type refractive index profile as shown in FIG. 2. It should be noted in this connection that, since the W+segment core type renders the refractive index profile more complex, even the structure of the W type refractive index profile referred to above is not contradictory at all to the subject matter of the present invention in the case where the bend loss is permitted.

The W+segment core type structure is highly effective in the aspect of suppressing the bend loss. However, it is possible for the cutoff wavelength $\lambda_{cc}$ in the length of the actually used line to be increased to 1550 nm or more. The increase of $\lambda_{cc}$ to 1550 nm or more leads to failure to satisfy the single mode (SM) condition in transmitting the signal at the wavelength of 1.55 μm band. Therefore, it is necessary for the cutoff wavelength $\lambda_{cc}$ to be not longer than 1550 nm in terms of the compensation of the SM operation in the transmission band. Of course, since the increase of the bend loss brings about an inconvenience such as an increase of the loss in preparing a module, it is important to suppress the bend loss while maintaining the cutoff wavelength $\lambda_{cc}$ at 1550 nm or less.

Figure 5:
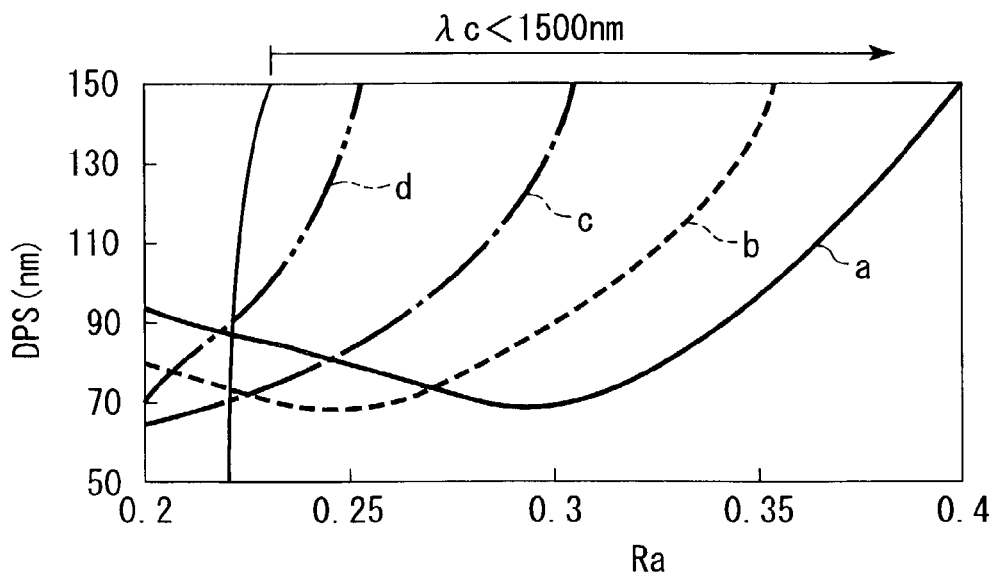
FIG. 5 is a graph showing the relationship between Ra and DPS of DSCF having a W+segment type refractive index profile.

First of all, the changes in the characteristics were examined by setting the bend loss at a prescribed value (5 dB/m@20 mm) while changing the values of $\Delta 2$ and Ra1, which give the most serious influences to the dispersion characteristics in the W+segment core type refractive index profile. FIG. 5 is a graph showing the changes in the characteristics under the conditions that the value of $\Delta 1$ was set at 2.4%, the α-value was set at 6, the value of $\Delta 3$ was set at 0.3%, and value of Ra3 was set at 1.5.

In the graph shown in FIG. 5, curves "a", "b", "c" and "d" denote the characteristics under the conditions that the relative refractive index difference $\Delta$ were set at −1.1%, −0.9%, −0.7% and −0.5%, respectively.

FIG. 5 shows that the DPS value not larger than 80 nm can be obtained by finding the value of Ra that minimizes the value of DPS for each value of $\Delta 2$. It has been found, however, that, unless the absolute value of $\Delta 2$ is increased to some extent, the cutoff wavelength $\lambda_{cc}$ is increased to 1550 nm or more before the DPS value is sufficiently diminished.

The DPS value not larger than 80 nm was obtained only when $\Delta 2$ was not larger than −0.7%, more preferably not larger than −0.8%. It has also been found that the value of Ra required in this case was between 0.20 and 0.50.

It is necessary for $\Delta 1$ to be not smaller than 1.8%. When $\Delta 1$ was not smaller than 1.8%, it was possible to obtain a target value of the DPS while maintaining the low bend loss characteristics. It has been found that, when $\Delta 1$ is smaller than 1.8%, the absolute value of dispersion is lowered to 20 ps/nm/km or less, or the bend loss characteristics are rendered poor, i.e., the bend loss characteristics are increased to 20 dB/m or more at the diameter of 20 mm. However, where $\Delta 1$ exceeds 2.8%, it has been found that the transmission loss is deteriorated, and that the DPS value is not lowered to 80 nm or less. Under the circumstances, it is desirable for $\Delta 1$ to fall within a range of between 1.8% and 2.8%.

Also, it has been found that it is desirable for the a constant denoting the shape of the center core to be between 1.5 and 15. Where the α constant is smaller than 1.5, the bend loss at the diameter of 20 mm is increased to 20 dB/m or more. On the other hand, it is desirable for $\Delta 3$ to be not smaller than 0.2% in order to prevent the bend loss at the diameter of 20 mm from being increased to 10 dB/m or more and to be not larger than 0.6% in order to prevent the cutoff wavelength $\lambda_{cc}$ from being increased to 1550 nm or more.

Further, concerning the diameter ration, it is desirable for the diameter $2c$ of the segment core to be between 1.3 and 1.8 when the diameter $2b$ of the side core is set at 1. Where the ratio c/b is smaller than 1.3, the value of the bend loss at the diameter of 20 mm is increased to 20 dB/m or more. On the other hand, where the ratio c/b exceeds 1.8, the cutoff wavelength $\lambda_{cc}$ is increased to 1550 nm or more.

Table 7 shows an example of the refractive index profile obtained from the result of the simulation, which is capable of achieving good characteristics while maintaining the DPS value not larger than 150 nm at the wavelength of 1550 nm (or not larger than 80 nm for the DCF for compensating the high dispersion slope NZ-DSF) and the dispersion value not larger than −20 ps/nm/km.

longer than 1550 nm. Particularly, it has been found that it is possible to achieve even the DPS value not larger than 60 nm in the case where $\Delta 2$ is set at −1.0% or less.

As described above, it has been that it is possible to achieve simultaneously the DPS value not larger than 80 nm in the C-band, the dispersion value not larger than −20 ps/nm/km, the value of $\lambda_{cc}$ not larger than 1550 nm, and the value of the bend loss under the diameter of 20 mm, which is not larger than 10 dB/m, by optimizing the refractive index profile. Also, as apparent from the result of the simulation, it is possible to expect amplification characteristics (amplification efficiency) satisfactory as a Raman amplification medium because the effective core cross sectional area $A_{eff}$ is small, i.e., not larger than 13 μm².

The present invention provides a DSCF for the NZ-DSF adapted for the Raman amplification and has achieved the dispersion characteristics capable of obtaining wide band low dispersion characteristics after the connection. The dispersion characteristics of the DSCF are absolutely necessary for the high speed transmission in the future. The new type system prepared by using the low nonlinear DSCF and the DSCF noted above has made it possible to manufacture easily a system adapted for the large capacity transmission at a high speed.

TABLE 7

| $\Delta 1$ % | α | $\Delta 2$ % | $\Delta 3$ % | a:b:c | Core diameter* μm | Dispersion ps/nm/km | DPS nm | $A_{eff}$ μm² | λc nm | Bending loss dB/m |
|---|---|---|---|---|---|---|---|---|---|---|
| 2.2 | 3.0 | −0.50 | 0.20 | 0.30:1:1.60 | 9.4 | −71 | 132 | 12.8 | 1464 | 2.0 |
| 2.0 | 6.0 | −0.80 | 0.30 | 0.30:1:1.65 | 8.4 | −96 | 78 | 11.0 | 1343 | 6.0 |
| 2.0 | 8.0 | −0.90 | 0.20 | 0.30:1:1.70 | 8.6 | −143 | 65 | 10.4 | 1333 | 8.0 |
| 2.1 | 6.0 | −0.90 | 0.22 | 0.31:1:1.70 | 8.8 | −122 | 66 | 10.3 | 1378 | 7.0 |
| 2.2 | 7.0 | −1.00 | 0.30 | 0.30:1:1.60 | 9.0 | −217 | 57 | 10.0 | 1444 | 11.0 |
| 2.0 | 9.0 | −1.10 | 0.30 | 0.32:1:1.60 | 9.1 | −156 | 51 | 9.7 | 1444 | 5.0 |

Note: *Core diameter represents the value of 2b.

In Table 7, the core diameter represents the diameter "$2b$" of the second core layer 2, the dispersion represents the dispersion value at the wavelength of 1550 nm, the DPS represents the DPS value at the wavelength of 1550 nm, $A_{eff}$ represents the effective core cross sectional area at the wavelength of 1550 nm, $\lambda_{cc}$ represents the cutoff wavelength, and the bend loss represents the bend loss at the diameter of 20 mm at the wavelength of 1550 nm.

As shown in Table 7, the dispersion value not larger than −20 ps/nm/km is achieved at the wavelength of 1550 nm while maintaining a sufficiently small value of $A_{eff}$, which is not larger than 13 μm², and a sufficiently small value of the DPS, which is not larger than 80 nm. It was also possible to obtain low bend loss characteristics, i.e., the bend loss not larger than 20 dB/m at the diameter of 20 mm, while maintaining a short cutoff wavelength $\lambda_{cc}$, which is not The effectiveness of the present invention will now be confirmed by referring to the following Examples of the present invention.

Specifically, prepared were two optical fibers (DSCF) each having the W+segment core type profile as shown in FIG. 2. The DSCF for the trial manufacture Example 1 was manufactured with the characteristics of the sample shown in Table 4, second row, used as the target. On the other hand, the DSCF for the trial manufacture Example 2 was manufactured with the characteristics of the sample shown in Table 7, sixth row, used as the target. Table 8 shows the results.

TABLE 8

| | Dispersion ps/nm/km | Dispersion slope ps/nm²/km | DPS nm | Transmission loss dB/km | $A_{eff}$ μm² | λc nm | Bending loss dB/m | PMD ps/√km |
|---|---|---|---|---|---|---|---|---|
| 1 | −96.7 | −1.27 | 76 | 0.58 | 10.9 | 1446 | 5.0 | 0.08 |
| 2 | −140.9 | −2.61 | 54 | 0.65 | 9.9 | 1453 | 7.8 | 0.09 |

In Table 8 given above, the transmission loss and PMD represent the transmission loss at the wavelength hand the polarization mode dispersion at the wavelength of 1550 nm.

As shown in Table 8, the DSCF for each of the two trial manufacture Examples was capable of obtaining the desired DPS value not larger than 80 nm, which was impossible to achieve in the prior art. Also, since the effective core cross sectional area $A_{eff}$ was about 10 to 11 μm², a very high Raman amplification efficiency can be expected.

Also, since the dispersion value is about −100 to −150 ps/nm/km, the DSCF, having a length of about 1/20 to 1/30 times of the length of the high dispersion slope NZ-DSF having a local dispersion of 5 ps/nm/km, permits compensating for the dispersion of the NZ-DSF. In other words, it is possible for the DSCF having a length of 1 km permits compensating for the dispersion of the NZ-DSF having a length of 20 to 30 km.

The cutoff wavelength $\lambda_{cc}$ is suppressed to a small value of 1500 nm or less, and the bend loss at the diameter of 20 mmφ is also suppressed to a small value of 10 dB/m or less. As a result, characteristics suitable for arranging an optical fiber module could be obtained. It has also been found that the transmission loss and the PMD are suppressed to low levels.

In this Example, a DSCF for a high dispersion slope type NZ-DSF was manufactured on the trial basis, which permits obtaining a very small value of the effective core cross sectional area $A_{eff}$. However, the present invention is not limited to this Example, as far the effective core cross sectional area $A_{eff}$ not larger than 13 μm² is satisfied.

Figure 6:
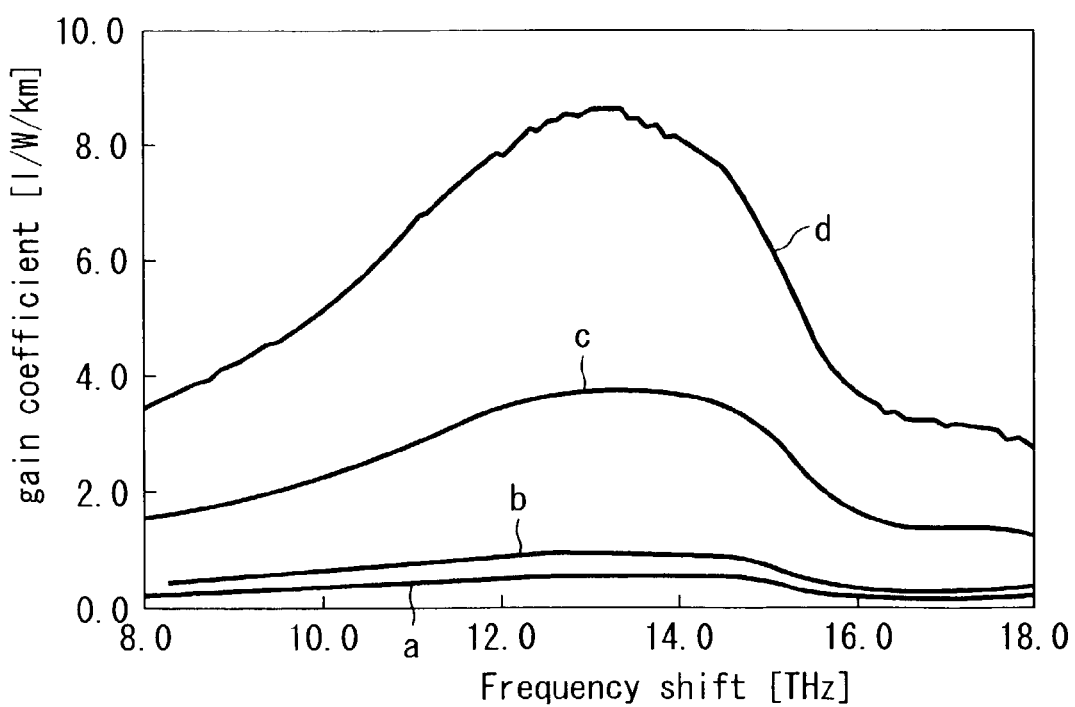
FIG. 6 is a graph showing the Raman amplification characteristics of the DSCF of the present invention in comparison with those of the conventional optical fiber.

The Raman amplification characteristics were evaluated in respect of the DSCF for the trial manufacture Example 1 shown in Table 8. FIG. 6 shows the result of the evaluation of the Raman amplification characteristics together with the results of the evaluation for the other optical fibers. Incidentally, curves "a", "b", "c" and "d" shown in FIG. 6 denote the Raman amplification characteristics for the ordinary SMF, for the ordinary NZ-DSF, for the ordinary DCF, and for the DSCF for trial manufacture Example 1 shown in Table 4. The characteristics of each of the optical fibers were as shown in Table 9 below:

TABLE 9

| Fiber type | Dispersion ps/nm/km | Dispersion slope ps/nm²/km | Transmission loss dB/km | $A_{eff}$ μm² |
|---|---|---|---|---|
| Ordinary SMF | 17.0 | 0.060 | 0.190 | 80 |
| Ordinary NZ-DSF | 5.0 | 0.070 | 0.205 | 50 |
| Ordinary DCF | −100 | −0.300 | 0.450 | 18 |
| DSCF for present invention | −97 | −1.270 | 0.600 | 11 |

As shown in FIG. 6, in the DSCF of the present invention, the effective core cross sectional area $A_{eff}$ is suppressed to 13 μm² or less so as to obtain a large Raman amplification efficiency, compared with the other optical fibers. In this fashion, it was demonstrated by the DSCF actually manufactured on the trial basis that the optical fiber of the present invention exhibits an excellent Raman amplification efficiency.

Incidentally, the present invention is not limited to the various embodiments and the Example described above and can be modified in various fashions. For example, in the embodiments described above, the core 4 is of a three layer structure including the first core layer 1, the second core layer 2 and the third core layer 3. However, it is possible for the optical fiber of the present invention to comprise a core having four or more layers.

Also, in the optical fiber of the present invention, it is possible to omit the third core layer 3 included in the embodiments described previously so as to provide a so-called "W type refractive index profile" as shown in FIG. 2.

In the case of the W type refractive index profile, it is difficult to lower the bend loss at the diameter of 20 mm to 10 dB/m or less at the wavelength of 1550 nm. However, it is possible to facilitate the manufacture of the optical fiber.

Also, in the optical fiber of the present invention, it is desirable for the bend loss, the dispersion value and the transmission loss at the wavelength of 1550 nm to fall within the ranges described previously in conjunction with the embodiments of the present invention. However, it is possible for these parameters to be somewhat deviated from the ranges noted above.

As described above in detail, in the optical fiber according to the second embodiment of the present invention, the DPS value at the wavelength of 1.55 μm band (C-band) is rendered close to the value of the DPS of the high dispersion slope type NZ-DSF by optimizing the refractive index profile. Also, in the optical fiber according to the third embodiment of the present invention, the dispersion value, the dispersion slope and the $A_{eff}$ value are allowed to fall within the prescribed ranges. It follows that the present invention makes it possible to provide a dispersion compensating optical fiber capable of effectively compensating for, particularly, the dispersion of the NZ-DSF having a large dispersion value. Also, excellent Raman amplification characteristics can be obtained by the dispersion compensated optical fiber of the present invention.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber that has a value of a ratio of a dispersion to a dispersion slope ranging between 50 nm and 150 nm at a wavelength of 1590 nm, and comprises a core and a clad covering the outer circumference of the core, wherein said core includes a first core layer formed in a central portion of the optical fiber, a second core layer contiguous to said first core layer and covering an outer circumference of said first core layer and forming a depressed layer, and a third core layer covering the outer circumference of said second core layer and having a refractive index larger than that of said clad and smaller than that of said first core layer, and wherein an outer diameter of said third core layer is 1.2 to 1.8 times an outer diameter of said second core layer.

2. The optical fiber according to claim 1, having a cutoff wavelength not longer than 1565 nm in the fiber length of 2 m.

3. The optical fiber according to claim 1, having a bend loss which is not larger than 10 dB/m, in a diameter of 20 mm, at a wavelength of 1590 mm.

4. The optical fiber according to claim 1, further having a dispersion not larger than −30 ps/nm/km at a wavelength of 1590 nm.

5. The optical fiber according to claim 1, wherein the second core layer has a relative refractive index difference not larger than −0.6% with the clad.

6. The optical fiber according to claim 1, wherein the second core layer has a relative refractive index difference not larger than −0.7% with the clad.

7. The optical fiber according to claim 1, having a relative refractive index difference of at least 1.8% between said first core layer and said clad.

8. The optical fiber according to claim 1, wherein the relative refractive index difference between said third core and said clad is between 0.1% and 0.6%.

9. The optical fiber according to claim 1, wherein the outer diameter of said first core layer is 0.15 and 0.45 times the outer diameter of said second core layer.

10. The optical fiber according to claim 1, wherein the transmission loss at the wavelength of 1590 nm is not larger than 1.0 dB/km.

11. An optical fiber module, comprising the optical fiber defined in claim 1.

12. An optical amplifier, comprising the optical fiber defined in claim 1 as a Raman amplifying body.

13. A dispersion compensating optical fiber that has a ratio of a dispersion to a dispersion slope ranging between 30 nm and 80 nm at a wavelength of 1550 nm, and comprises a core and a clad covering the outer circumference of the core,
wherein said core includes a first core layer formed in a central portion of the optical fiber, a second core layer contiguous to said first core layer and covering an outer circumference of said first core layer and forms a depressed layer, and a third core layer covering the outer circumference of said second core layer and having a refractive index larger than that of said clad and smaller than that of said first core layer, and
wherein an outer diameter of said third core layer is between 1.3 and 1.8 times an outer diameter of said second core layer.

14. The dispersion compensating optical fiber according to claim 13, wherein the cutoff wavelength under the fiber length of 22m is not longer than 1500 nm.

15. The dispersion compensating optical fiber according to claim 13, wherein the bend loss at the diameter of 20 nm is not larger than 10 dB/m at the wavelength of 1550 nm.

16. The dispersion compensating optical fiber according to any one of claims 13, 14 or 15, wherein the dispersion value at the wavelength of 1550 nm is not larger than −40 ps/nm/km.

17. The dispersion compensating optical fiber according to claim 13, wherein said first core layer has a relative refractive index difference of between 1.8% and 2.8% with the clad, and the α-value in a α-value refractive index profile of said first core layer is between 1.5 and 15.

18. The dispersion compensating optical fiber according to claim 13, wherein the outer diameter of said first core layer is between 0.20 and 0.45 times the outer diameter of said second core layer contiguous to said first core layer and covering the outer circumference of said first core layer.

19. The dispersion compensating optical fiber according to claim 13, wherein the relative refractive index difference of said third core layer with the clad is between 0.2% and 0.65%.

20. The dispersion compensating optical fiber according to claim 13, wherein the transmission loss at the wavelength of 1550 nm is not larger than 1.0 dB/km.

21. An optical fiber module, comprising the dispersion compensating optical fiber defined in claim 13.

22. An optical amplifier, comprising the dispersion compensating optical fiber defined in claim 13 as a Raman amplifying medium.

23. The dispersion compensating optical fiber according to claim 13, wherein said first core layer having a relative refractive index difference of not larger than −0.7% based on the clad.

24. A dispersion compensating optical fiber having a dispersion value not larger than −20 ps/nm/km, a dispersion slope not larger than −0.05 ps/nm$^2$/km, and an effective core cross sectional area $A_{eff}$ between 8 and 13 μm$^2$,
wherein the dispersion compensating optical fiber further has a W type refractive index profile including a center core having an α-refractive index profile, a side core having a refractive index smaller than that of the center core, and a clad having a refractive index smaller than that of the center core and larger than that of the side core, the center core being inside the side core and the clad, and the side core being inside the clad.

25. The dispersion compensating optical fiber according to claim 24, further having a ratio of the dispersion to the dispersion slope lying between 30 nm and 150 nm at the wavelength of 1550 nm.

26. The dispersion compensating optical fiber according to claim 24, further having a ratio of the dispersion value to the dispersion slope lying between 30 nm and 80 nm at the wavelength of 1550 nm.

27. The dispersion compensating optical fiber according to claim 24, further having a bend loss not larger than 20 dB/m at the diameter of 20 mm at the wavelength of 1550 nm.

28. The dispersion compensating optical fiber according to claim 24, further having a cutoff wavelength under the fiber length of 22m not longer than 1550 nm.

29. The dispersion compensating optical fiber according to claim 24, wherein Δ1 of said center core with the clad is not smaller than 1.8%, the α-value falls within a range of between 1.5 and 15, the relative refractive index difference Δ2 of said side core with the clad is not larger than −0.4%, and the ratio Ra1 of the core diameter of said center core to the core diameter of said side core is between 0.20 and 0.50.

30. The dispersion compensating optical fiber according to claim 29, wherein the relative refractive index difference Δ2 of said side core with the clad is not larger than −0.7%.

31. The dispersion compensating optical fiber according to claim 24, further having a W+segment type refractive index profile including a center core, a side core, a segment core, and a clad, which are arranged in the order mentioned as viewed from the inside.

32. The dispersion compensating optical fiber according to claim 31, wherein the relative refractive index difference Δ3 of said segment core with the clad is between 0.2% and 0.6%, and the ratio Ra2 of the core diameter of said segment core to the core diameter of said side core is between 1.3 and 1.8.

33. An optical fiber module, comprising the dispersion compensating optical fiber defined in claim 24.

34. An optical amplifier, comprising the dispersion compensating optical fiber defined in claim 24 as a Raman amplifying medium.

* * * * *